March 10, 1959 E. G. CLARK 2,877,347
SIGNAL MATRIXING CIRCUIT
Filed April 8, 1954
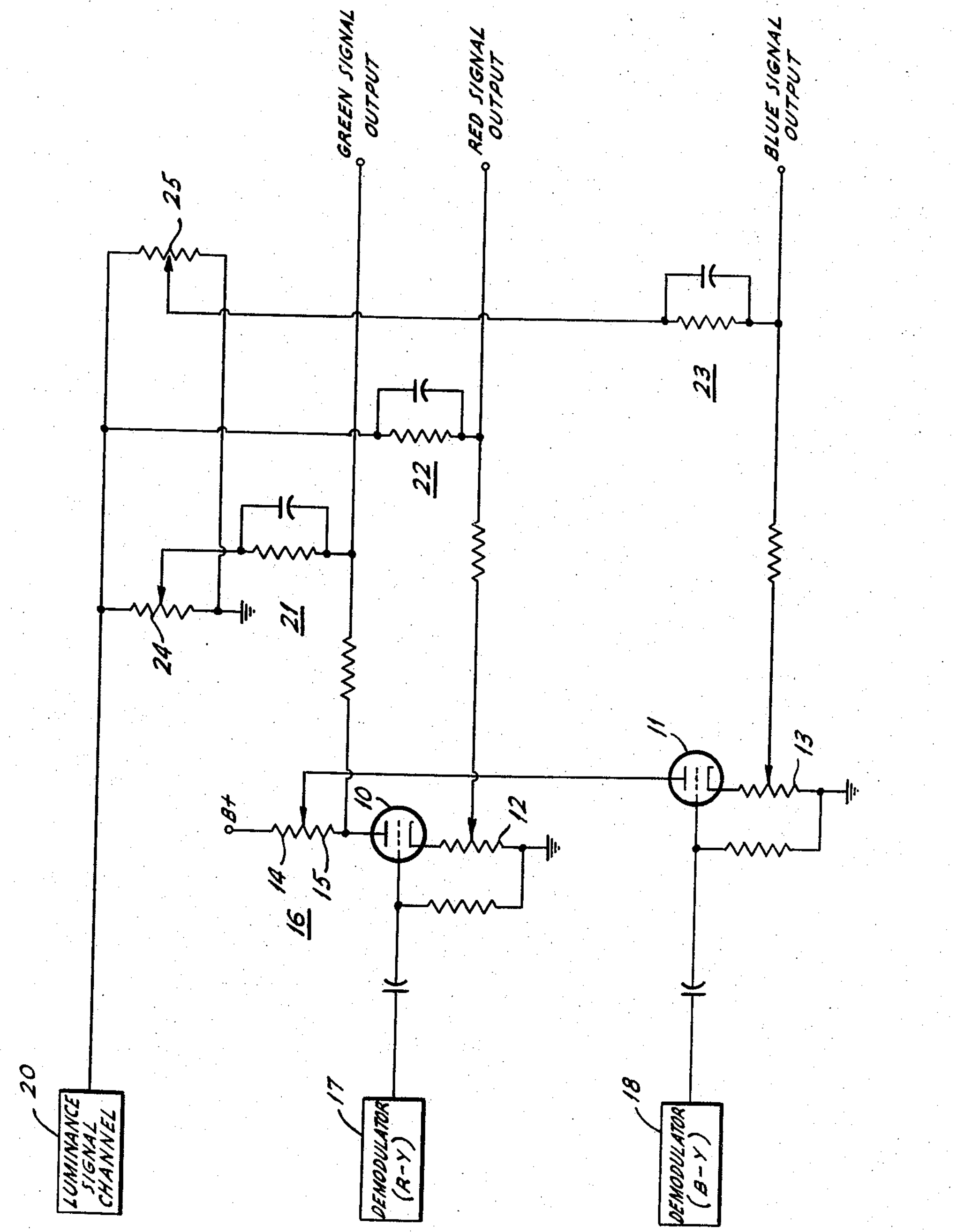
INVENTOR.
EDWARD G. CLARK
BY
[signature]
ATTORNEY United States Patent Office 2,877,347

Patented Mar. 10, 1959

2,877,347

SIGNAL MATRIXING CIRCUIT

Edward G. Clark, Elkins Park, Pa., assignor to Philco Corporation, Philadelphia, Pa., a corporation of Pennsylvania Application April 8, 1954, Serial No. 421,945

9 Claims. (Cl. 250—27)

The invention relates to a new signal combining circuit and, more particularly, to a new and improved circuit for effecting the additive combination of different fractions of separate signals.

While circuits for performing the aforementioned signal combining operation have wide utility, they are particularly useful in certain forms of color television receivers. Accordingly they will be described principally in their application to such receivers.

The color television receivers referred to are adapted to be supplied with a composite signal which has three principal components representative of intelligence concerning the image content of the televised scene. One of these components is a wideband signal representative of the luminance of successively scanned portions of the televised image, while the other two are comparatively narrowband signals respectively representative of two chrominance components of the same scene. In order to render the chrominance components readily distinguishable from the luminance component, the former are utilized at the transmitter to modulate two subcarrier waves, of nominally equal frequencies but of different phases, and the resultant modulated subcarrier waves are transmitted along with the luminance component.

At a receiver supplied with such a signal, as well as with suitable auxiliary signals, such as horizontal, vertical and color synchronizing signals, it is then possible to separate the chrominance components from the luminance component merely by frequency selection. On the other hand, the two chrominance components, which occupy a common modulation frequency range, are separated from each other by means of two synchronous demodulators. Each of these demodulators is supplied with both of the chrominance modulated subcarrier waves. In addition, one of the demodulators is supplied with a signal of subcarrier frequency and of the same phase as one of the received subcarrier waves, while the other demodulator is supplied with a signal, also of subcarrier frequency but of the same phase as the other received subcarrier wave. By the foregoing means there are reconstituted, at the receiver, the luminance component and the two chrominance components of the received signal, all in separate channels and all reduced to their lowest, or video frequency ranges.

It is well known, however, that most presently contemplated television receivers are of the so-called three-color type, which contain image display devices capable of reproducing three different primary color components of each individual picture element. Such picture display devices are available in a variety of specific forms. For example, a crude form of such a display device may comprise three separate cathode ray tubes, each of which is capable of forming a complete image of the televised scene in one of the aforementioned primary colors, the individual images being optically superposed by an appropriate arrangement of dichroic mirrors.

Another form of such a three-color image display device consists of a single cathode ray tube having a screen structure composed of minute, closely spaced, fluorescent elements, adjacent ones of which are responsive to electron impingement to emit light of the three different primary colors. These elements may then be appropriately excited, either sequentially by means of a single electron beam which is caused to impinge upon screen elements emissive of light of the three different primary colors in recurring sequence, or simultaneously by means of three separate electron beams which are respectively impinged upon screen elements emissive of light of the different colors.

If the only chrominance representative signals utilized to control the operation of such a display device are the two which are derived from the received signal in the aforedescribed manner, then each picture element will be reproduced in only two primary colors and the inherent capability of the display devices to reproduce each picture element in three primary colors will not be utilized. Instead the gamut of colors which such display devices produce will be severely and unnecessarily restricted. This can be avoided if there is produced, at the receiver, yet another signal representative of a third component of chrominance intelligence.

It is well known that the received composite signal, and particularly that portion thereof which consists of the two aforementioned subcarrier waves, contains not only information concerning the aforedescribed chrominance components, but also information concerning a third such component. One known way of deriving from the received subcarrier waves a signal representative of this third chrominance component is to subject these waves to a third synchronous demodulation operation, utilizing a demodulating signal of the same frequency as the subcarrier waves but of a different phase from either of the two other demodulating signals.

However, this particular approach has the serious disadvantage of requiring the use of an additional demodulator—a comparatively costly device which is also a source of color infidelity owing to the inherently non-linear characteristics upon which its demodulating operation depends.

It has been recognized that the use of a third demodulator can be avoided by synthesizing the additional chrominance signal, required for optimum receiver operation, from the two other chrominance signals after the latter have been derived from the received subcarrier waves by demodulation.

In particular it has been found that this additional signal can be produced by the additive combination of different fractions of each of the two other demodulated signals. The exact values of these fractions, and also the phase relationships with which the fractional signals must be combined, will depend, of course, upon the specific forms of the demodulated chrominance signals and also upon the specific composition of the signal which is to be formed. However, for any particular case, these quantities can be readily determined by the application of conventional principles of colorimetry.

In a typical case, one of the demodulated chrominance signals may have an amplitude representative of the difference between the red primary color component of the televised scene and the luminance of the scene (this is conventionally known as the R—Y signal) while the other demodulated signal may have an amplitude representative of the difference between the blue primary color component of the televised scene and the luminance of the scene (this other signal being known as the B—Y signal). If the received signal containing these components is to be used to best advantage in controlling an image display device capable of reproducing the red, green and blue color components of the televised scene, then it becomes desirable to produce, at the receiver, a third chrominance signal whose amplitude is equal to the difference between the green primary color component of the televised scene and its luminance. Such a component can be formed by additively combining a signal whose magnitude is 0.509 times that of the R—Y signal and a signal whose magnitude is 0.191 times that of the B—Y signal, said signals being opposite in polarity to the R—Y and B—Y signals respectively.

Combining circuits have been devised in the past for the purpose of synthesizing a G—Y signal from the R—Y and B—Y signals in the aforedescribed manner. However these circuits suffer from certain defects which render them unsuitable for commercial application. The most common of these defects is an inability to maintain, under dynamic operating conditions, the desired fractional relationships between the original chrominance signals and the components which are derived therefrom in the process of forming the synthesized chrominance signal. Another defect of prior circuits is their inability to produce the synthesized signal without causing undesirable interaction between the original chrominance signals themselves. Both of these defects are often aggravated by long term variations in certain circuit components, e. g. in the vacuum tubes used in these prior combining circuits.

I have found that the aforementioned characteristic defects of prior signal combining circuits used for the purpose under consideration stem primarily from the fact that, in these prior circuits, the different signals involved traversed different paths in which they were distorted to different degrees.

Accordingly it is a primary object of the invention to provide a new and improved signal combining circuit.

It is another object of the invention to provide a new signal combining circuit which is capable of effecting the additive combination of different fractions of two separate signals.

It is still another object of the invention to provide a new circuit for deriving, from a pair of separate signals, a third signal whose amplitude is equal to the sum of different fractions of the separate signals, without however affecting the amplitudes of the separate signals themselves.

It is a further object of the invention to provide a circuit for combining different fractions of two separate signals, the circuit being characterized by the fact that it distorts all of the signals involved to substantially the same degree.

It is a still further object of the invention to provide a new circuit, for use in a color television receiver, which is adapted to be supplied with two signals representative of different chrominance components of a televised scene and which is responsive thereto to produce a plurality of output signals, one of which is representative of a third chrominance component of the same scene and is constituted of the sum of different fractions of the original signal, while two other output signals correspond respectively to the two supplied signals, the circuit being further characterized by the fact that all the aforementioned output signals are formed without any appreciable interaction between them.

The aforegoing objects of the invention, as well as others which will appear, are achieved by means of a circuit which includes a pair of vacuum tubes, each having at least anode, cathode and control grid electrodes. External impedance elements are connected to these electrodes in such a manner that the two vacuum tubes have at least one common impedance element through which flow the anode currents of both tubes and that at least one of the tubes has an additional impedance element through which flows only its own anode current. In addition separate impedance elements are provided for the flow of the cathode currents of the two separate vacuum tubes.

By appropriate proportioning of the values of the aforementioned impedance elements relative to the vacuum tube impedances and also relative to each other this circuit may be caused to operate, in accordance with the invention, to form the sum of different fractions of signals applied thereto and to accomplish this formation without any of the undesired side-effects encountered in the use of prior art circuits for the same purpose.

The principal considerations which govern the selection of these impedance values are the following. First the various aforementioned impedance elements are chosen with such values that each anode and cathode load impedance which they form has a net effective value which is substantially smaller than the value of the internal anode load resistance of each vacuum tube. It may be shown that this has the effect of rendering the intensity of the anode current which flows in each tube substantially independent of the exact value of the anode load impedance of the same tube and of placing this current intensity principally under the control of the cathode load impedance of the tube. The impedance elements which form these cathode load impedances of the vacuum tubes are further chosen with such values that signals of equal amplitudes, when applied to the control grid electrodes of both tubes, will produce anode currents of equal intensities. It will be seen that this is feasible, in the circuit under consideration, despite the fact that the tubes may have different values of net effective anode load impedance, because of the aforementioned independence of anode current intensity from anode load impedance.

It is apparent that, in consequence of the aforementioned proportioning of impedances to produce flow there will be developed, across the aforementioned there will be developed, across the aforemnetioned common anode impedance element, component signal potentials which are equal fractions of the signals applied to the respective tubes. Furthermore, since these component potentials are actually developed across the same impedance element, the total signal potential developed across this common impedance element will be equal to the sum of the component potentials. Across the additional impedance element, through which as has been pointed out, there flows the anode current of only one of the tubes, there will be developed an additional potential which is a fraction of the signal which is applied only to this one tube. Consequently, from the series combination of the two impedance elements in question there may be derived a signal which is the sum of three quantities—namely, the two equal fractions of the applied signals which are developed across the common impedance element, and the additional fraction of one of these applied signals which is developed across the additional impedance element. The signal derived in this manner is clearly equal to the sum of different fractions of the signals applied respectively to the different vacuum tubes.

It is a feature of the invention that the relative values of these different signal fractions may then be controlled by adjusting the value of the impedance element through which the anode currents of both tubes flow, relative to the value of the impedance element through which the anode current of only one tube flows, without producing any adverse effect upon other functions of the circuit.

If the two signals which are applied to the vacuum tubes under the aforedescribed circumstances are the demodulated chrominance signals which have been previously described, then the several impedance elements associated with the tubes to form my novel combining circuit are preferably resistors. Such resistors have finite and substantially uniform impedance values at all chrominance signal frequencies. Furthermore the fractional signals developed across the resistors which form the anode load impedances in such a circuit will have phases substantially opposite to those of the applied signals throughout the frequency range of interest. From the separate cathode load resistors of these vacuum tubes, on the other hand, signals corresponding to the applied signals themselves may be separately derived and these latter signals will have the same phases as the applied signals. Consequently there will exist, between the combined signal which is derived from the anode load resistors, on the one hand, and each of the two separate signals derived from the cathode load resistors, on the other hand, just that phase relationship which is required to exist between the several chrominance signals in the typical case under consideration.

The details of a preferred embodiment of my invention are illustrated in, and will be described with reference to, the single figure of the accompanying drawing.

As will be apparent from this figure the principal active elements of a signal combining circuit embodying my invention are two triode vacuum tubes 10 and 11, which may be of any conventional construction. For reasons which will appear hereinafter it is desired that these triodes have the property of responding to applied signals in a generally similar manner. Consequently these triodes are preferably selected with generally similar operating parameters, such as amplification factors and internal anode resistance values, for example. In practice these triodes may be constituted respectively by the separate triode sections of a tube whose commercial type designation is 12AT7 and which is characterized by the presence of two complete sets of triode elements within a single envelope. These two sets of triode elements usually have sufficiently similar operating parameters for my purpose. Further in accordance with the invention the cathodes of the separate triodes are respectively connected to ground through separate, unbypassed resistors 12 and 13. While these cathode load resistors may take the form of ordinary resistor elements of fixed value, it is preferred that they be constituted by the resistor elements of potentiometers, as this gives the entire circuit a flexibility which is desirable under circumstances described in detail hereinafter. The anodes of both triodes 10 and 11, on the other hand, are both connected to a conventional source of anode potential B+ through a common resistor element 14. In addition, the anode of triode 10 is connected to this resistor element 14, not directly, as is the anode of triode 11, but through an additional series resistor element 15. While these anode load resistor elements 14 and 15 may also be formed of separate, ordinary resistor elements, it is again preferred, for greater operational flexibility, that they be constituted by different portions of the resistor element 16 of a potentiometer. More particularly the anode of triode 10 and the source of anode potential B+ are respectively connected to the fixed terminals of this potentiometer, while the anode of tube 11 is connected to its adjustable terminal. With such an arrangement it is possible to vary the relative resistance values of the common resistor element 14, and of the separate resistor element 15, merely by adjusting the setting of the variable potentiometer terminal.

In the application of the aforedescribed circuit to the kind of television receiver system which has been briefly described hereinbefore, the control grid electrode of triode 10 is supplied with a video signal which is representative of the R—Y chrominance component of the received signal and which is derived from a demodulator 17, productive of such a signal. The control grid electrode of triode 11, on the other hand, is supplied with a signal which is representative of the corresponding B—Y chrominance component of the televised scene, and which is derived from a conventional demodulator 18 productive of such a signal. Each of these demodulators may take any one of numerous conventional forms without affecting the operation of the circuit which embodies my invention. Consequently the demodulators have been represented in the drawing merely by appropriately labeled rectangles. It is apparent that each of the aforedescribed applied signals will cause corresponding current flow through the anode and cathode load resistors of the vacuum tube to which it is applied. In particular, the anode currents of both triodes will flow through the resistor element 14 which is common to the anode circuits of both. Through resistor element 15, on the other hand, there will flow only the anode current of triode 10. Consequently there will be developed across resistor element 14 a potential whose value is equal to the product of two quantities, one of which is the sum of the individual anode currents of the two triodes, while the other is the resistance value of resistor element 14. Across the resistor element 15, on the other hand, there will be developed a signal which is equal to the product of the anode current of triode 10 only, and the resistance value of resistor element 15. Across the series combination of resistor elements 14 and 15—i. e. across the entire potentiometer resistor 16 in the preferred embodiment illustrated—there will be developed a potential equal to the sum of the potentials which are separately developed across resistor elements 14 and 15, the former being, in turn, the sum of the potentials developed by the flow of both anode currents through a common resistor.

In accordance with the invention the various potentiometers are so constructed and arranged that their fixed resistor elements have resistance values which are much smaller than the internal anode resistance value of either triode. Typically the resistance value of each external element may be of the order of one-tenth the internal anode resistance. In such an arrangement each of the triodes is subjected to heavy degenerative feedback, with far reaching effects on its performance. In the first place, this feedback frees the anode current from its normal dependence upon the anode load of the tube and makes it substantially independently controllable by means of the cathode load resistance. Therefore, by appropriate selection of the resistance values of their cathode load resistors, triodes 10 and 11 may be caused to produce equal amounts of anode current is response to equal applied signals. Furthermore, the existence of degenerative feedback causes the operating characteristics of the triode to be substantially linear over large portions of their useful ranges. Because of this, and because of the aforementioned inherent similarity between the operating characteristics of the tubes, the aforementioned equality of anode currents in response to equal input signals will be maintained over a wide range of variations in the amplitudes of the input signals.

Since, as has been pointed out, the relationships between the anode currents and the input signals in the circuit under consideration are determined without reference to the specific values of the anode load resistors, the latter may be proportioned in any manner which is necessary for the development of the desired output potentials, provided, of course, that their values are kept small compared to the internal anode resistance values of the tubes.

In particular, the potentiometer resistor 16 is constructed and arranged with such a resistance value that the product of this resistance value, and the current which flows through the entire resistor in response to the R—Y signal applied to triode 10, is substantially equal to that fraction of this applied signal which it is desired to use as one of the constituents of the G—Y signal. In the exemplary case under consideration this potentiometer resistor should have such a resistance value that the product of this value and the anode current of triode 10 is substantially equal to 0.509 times the applied R—Y signal. The adjustable terminal of this potentiometer, whose position on the resistor 16 determines the resistance value of the resistor element 14, is then set to such a position that the product of this resistance value, and the anode current of triode 11 which flows through this resistor element in response to the B—Y signal, is substantially equal to that fraction of the B—Y signal which forms the second constituent of the G—Y signal. In the particular case under consideration this resistance value should be such that the signal developed across resistor element 14 is substantially 0.191 times the applied signal.

Across the entire potentiometer resistor 15 there will then be developed the sum of two different fractions of the signals which are applied to the respective triodes. It is to be noted that, owing to the phase inversion which normally takes place when signals are transferred from the grid to the anode of a triode, each of the components of this sum signal has a phase opposite to that of the applied signal from which it is derived. This is particularly advantageous for reasons which will appear hereinafter.

Since the anode current of triode 10 flows through a resistance of greater value than the anode current of triode 11, the fraction of the signal applied to triode 10 which is developed across the potentiometer resistor is also greater than the fraction of the signal applied to triode 10 which is developed across the same potentiometer resistor. This relationship is proper under the circumstances because the fraction of the demodulated R—Y signal which is required for the formation of the G—Y signal is greater than the fraction of the demodulated B—Y signal which is required for the same purpose. Under certain other circumstances it may be desirable to synthesize a chrominance signal containing a greater fraction of the B—Y signal than of the R—Y signal. In such a case it will clearly be necessary to apply the B—Y signal to the triode having the effective anode load resistance of greater value.

It is to be noted that the degenerative feedback provided by cathode load resistors 12 and 13 not only gives rise to the aforementioned independence between anode current and anode load resistance, but also stabilizes the long term operating characteristics of each of the triodes. This stabilizing influence is so pronounced that it may even be permissible to replace either or both of the triodes with different tubes of the same commercial type without making it necessary to realign the circuit.

So far it has been shown how the circuit embodying my invention operates to form a signal constituted of the sum of different fractions of two separate applied signals. However, it will be recalled that it is also desired to produce, by means of the same circuit, two additional signals which are substantially identical to the applied signals and which are not subject to appreciable interaction, either between each other, or between the synthesized signal and any of the additional signals. In the circuit illustrated, additional signals which meet these requirements are developed across the respective cathode load resistors 12 and 13 of triodes 10 and 11. Each of these signals has substantially the same phase as the signal applied to the respective tube, owing to the well-known cophasal relationship between grid and cathode signals. Furthermore, each of these derived signals has substantially the same form and amplitude as the corresponding applied signal. This similarity is another desirable consequence of the heavy degenerative feedback to which each triode circuit is subjected.

The significance of the previously noted phase reversal between each applied signal, and the constituents of the synthesized signal which are developed in response thereto, will now be appreciated. Since this synthesized signal contains fractions of the applied signals in opposite phases, whereas the separate signals derived from the cathodes are in the same phases as the applied signals, the circuit under consideration is particularly adapted for the production of the three typical chrominance signals hereinbefore described.

As has been pointed out hereinbefore the use of potentiometers for the cathode and anode load resistors is prompted by the desire to impart flexibility to the combining circuit. In particular it will be seen that the use of potentiometer 16 for the anode load of both triodes permits the adjustment of the proportions in which fractions of the original chrominance signals are combined to form the third chrominance signal. This makes the circuit useful in preparing the received signals for application to a wide variety of image display devices, requiring chrominance signals of different compositions. It is to be noted that, owing to the aforementioned independence between anode currents and anode load resistance values, adjustments made by means of potentiometer 16 have no adverse effect upon the operation of the circuit.

The use of potentiometers as the respective cathode load resistors of the tubes makes possible the adjustment of the amplitudes with which signals corresponding to the original, applied chrominance signals are separately derived from this combining circuit. While it is frequently desired to derive these latter signals with substantially the same relative amplitudes as the corresponding signals produced by the demodulators, there do exist situations in which it is necessary to derive these two signals with changed relative amplitudes. For example, changes in these relative amplitudes may become necessary to compensate for gradual changes in the color reproducing characteristics of the image display device, or in the characteristics of other chrominance signal utilization means. Such changes can then be made very conveniently by repositioning appropriately the variable terminals of the cathode potentiometers from which the signals in question are derived.

It is to be noted that the adjustments, which may be made by means of the potentiometers illustrated in the drawing, affect the absolute amplitudes of the derived R—Y and B—Y signals and also the amplitudes of each of these signals relative to each other and relative to the amplitude of the synthesized G—Y signal. However, no adjustment is provided in this circuit for the absolute amplitude of this G—Y signal. If it is considered necessary to make this amplitude adjustable too, this may be accomplished simply by connecting the entire resistor element of still another potentiometer in parallel with the potentiometer resistor 16, between the source of anode potential B+ and the anode of triode 10. A G—Y signal of variable absolute amplitude but constituted of fractions of the R—Y and B—Y signals in substantially fixed proportions, may then be derived from the adjustable terminal of such an additional potentiometer.

It has been pointed out hereinbefore that one of the important advantages of my invention is that the several separate output signals which have been described are formed without any undesired interaction between them. One reason for this absence of undesired interaction will be apparent when it is noted that one of the output signals of the illustrated circuit—namely, the combined signal resulting from the additive combination of different fractions of the input signals—is developed across the anode load of the vacuum tubes to whose control grid electrodes the separate input signals are applied. It is well known that triode vacuum tubes have very high reverse impedances, which means that no appreciable signal transfer takes place from the anode circuit to the signal input circuit through the tube itself. Consequently the output signal, which is developed across the common load resistor in response to the applied signals, will not be reproduced to any appreciable extent at the input of either vacuum tube.

So far as the cathode output signals are concerned, they are developed across circuit elements whose effective resistance is very much smaller than the grid circuit impedance of the same triode. This relationship is due to their inherently low values and also to their connection in the respective cathode circuits. In consequence of this relationship only a negligible fraction of the cathode output signal of each triode will reappear in its input circuit.

It will now be apparent that the synthesis of a third chrominance representative signal in accordance with the invention, and the development, at separate terminals, of this third signal and of two other signals corresponding respectively to the original chrominance signals is completely carried out by those portions of the illustrated circuit which have been described in detail hereinbefore. However, these various signals do not represent the actual primary colors of the televised scene, but only the difference between each of these primary colors and the luminance of the scene. Consequently they are not usually suitable for application to an image display device until each of them has been combined with the received luminance signal. This combination of each of the chrominance representative signals with the received luminance signal may, generally speaking, be carried out in any desired manner without affecting the operation of my combining circuit in accordance with the invention. However, a preferred circuit for accomplishing this combination is illustrated in the drawing in order to complete the disclosure. In this circuit, a luminance signal is derived from a conventional luminance channel 20 and this signal is added to each of the three separate chrominance signals by means of adding circuits 21, 22 and 23. Each of these adding circuits includes at least two resistors connected in series between the output terminal of source 20 and that terminal of my combining circuit at which any given chrominance signal is developed, the sum signal being derived, in each case, from the junction of these series resistors. To provide for the appropriate transfer of the high frequency components of the luminance signal, the resistors across which the luminance signal is developed are bypassed by suitable capacitors. Furthermore, the output signals of luminance signal channel 20 are preferably applied to adding circuits 21 and 23, not directly as to adding circuit 22, but rather by way of potentiometers 24 and 25, respectively. These potentiometers are provided in order to facilitate the adjustment of the proportions in which the luminance signal is added to the different chrominance signals. By appropriate adjustment of these proportions, white balance of any image display device may be achieved despite minor variations in the efficiencies with which different image display devices reproduce different primary colors. The three resultant color signals, which are respectively constituted of the sums of the luminance signal and of different ones of the chrominance signals, are then delivered to separate output terminals for subsequent application to an image display device in any conventional manner. It will be understood that the red, green and blue color signals which are thus developed at the respective output terminals need not be supplied to an image display device directly but may be passed, first, through suitable amplifiers and through whatever other circuits are necessary to prepare them further for application to the image display device.

It will be apparent from the foregoing that the signal combining circuit embodying my invention is so flexible as to be useful in a wide variety of situations. It will also be apparent that, in other applications, this circuit may take a number of specific forms other than that which has been illustrated without, however, departing from my inventive concept. Consequently I desire the scope of this concept to be limited only by the appended claims.

I claim:

1. A signal combining circuit adapted to be supplied with a pair of signals having components in a predetermined frequency range, said circuit comprising: a pair of vacuum tubes, each having at least anode, cathode and control grid electrodes; a first impedance element connected to provide a common path for the anode currents of both said tubes; a second impedance element connected to provide a path for the anode current of only one of said tubes; and third and fourth impedance elements each of which is connected to a different one of said tubes to carry only the entire cathode current thereof, all of said impedance elements having substantial impedance values within said frequency range of said applied signals.

2. In combination, a pair of cathode follower circuits, each consisting of a vacuum tube having at least triode elements and a load impedance connected to carry only the cathode current of the tube to which it is connected, means for supplying input signals respectively to the control grids of said vacuum tubes, means for deriving separate outputs from said load impedances respectively, a first anode load impedance connected to carry only the anode current of one of said tubes, a second anode load impedance connected to carry the anode current of both of said tubes, each of said anode load impedances having substantial impedance for said input signals, and means for deriving a further output signal proportional to the sum of the signals developed across said two anode load impedances.

3. A circuit according to claim 1 further characterized in that each of said impedance elements has an impedance value which is small compared to the internal anode resistance of the vacuum tube for whose current it provides a path.

4. A circuit according to claim 1 further characterized in that said third and fourth impedance elements have such impedance values that signals of equal amplitude, when applied to the control grid electrodes of said tubes, produce anode currents of equal intensities in both said tubes.

5. In combination, a pair of cathode follower circuits, each consisting of a vacuum tube having at least triode elements and a load impedance connected to carry only the cathode current of the tube to which it is connected, means for supplying input signals respectively to the control grids of said vacuum tubes, said signals having components in a predetermined frequency range, means for deriving separate outputs from said load impedances respectively, a first anode load impedance connected to carry only the anode current of one of said tubes, a second anode load impedance connected in series with said first anode load impedance, said second anode load impedance being connected to carry the anode current of both of said tubes, each of said anode load impedances having substantial impedance at frequencies within said frequency range, and means for deriving a further output signal developed across the series combination of said two anode load impedances which is proportional to the sum of the signals developed across each of said anode load impedances.

6. A circuit according to claim 2 characterized in that said first and second resistor elements are different portions of a single potentiometer resistor, the division between said portions being established by the position of the adjustable terminal of said potentiometer.

7. Apparatus according to claim 2 further characterized in that each of said third and fourth resistor elements is a potentiometer resistor.

8. In combination: means for producing in separate channels first and second signals respectively representative of different chrominance components of a televised scene, and means for deriving from said signals a third signal representative of a third chrominance component of said scene which is composed of different fractions of said first and second signals, said last-named means comprising a pair of cathode follower circuits, each consisting of a vacuum tube having at least triode elements and a cathode load impedance connected to carry only the cathode current of the tube to which it is connected, said first signal being supplied to the control grid of one of said tubes and said second signal being supplied to the control grid of the other of said tubes, a first anode load resistor connected to carry the anode current of both of said tubes, and a second anode load resistor connected to carry only the anode current of one of said tubes, each of said anode load impedances having a substantial impedance for said first and second signals, said third chrominance representative signal being developed across the series combination of said anode load resistors and being proportional to the sum of the signals developed across each of said anode load resistors.

9. In a color television system which includes separate sources of first and second signals respectively representative of different chrominance components of a televised scene, the combination comprising: means for deriving a third signal representative of a third chrominance component of said scene and composed of different fractions of said first and second signals, said means comprising a pair of cathode follower circuits, each consisting of a vacuum tube having at least anode, cathode and control grid electrodes, and a cathode load impedance connected to carry only the cathode current of the tube to which it is connected, each of said control grid electrodes being adapted to be supplied with one of said first and second signals respectively, a first resistor element connected to provide a common path for the anode currents of both said tubes, a second resistor element connected in series with said first resistor element to provide a path for the anode current of only one of said tubes, said third chrominance representative signal being developed across the series combination of said first and second resistor elements and being proportional to the sum of the signals developed across each of them.

References Cited in the file of this patent

UNITED STATES PATENTS

| | | |
|---|---|---|
| 2,185,367 | Blumlein | Jan. 2, 1940 |
| 2,547,598 | Roschke | Apr. 3, 1951 |
| 2,563,245 | Jofeh | Aug. 7, 1951 |
| 2,580,673 | Graham | Jan. 1, 1952 |
| 2,605,409 | Forbes | July 29, 1952 |
| 2,776,343 | Yuni | Jan. 1, 1957 |

FOREIGN PATENTS

| | | |
|---|---|---|
| 938,403 | France | Apr. 5, 1948 |
| 618,438 | Great Britain | Feb. 22, 1949 |
| 150,806 | Australia | Apr. 9, 1953 |